(12) United States Patent
Menten

(10) Patent No.: US 9,047,643 B2
(45) Date of Patent: Jun. 2, 2015

(54) METHOD OF EXTENDING WEB SERVICE APPLICATION PROGRAMMING INTERFACES USING QUERY LANGUAGES

(75) Inventor: Lawrence E. Menten, Upper Saddle River, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 274 days.

(21) Appl. No.: 13/423,697

(22) Filed: Mar. 19, 2012

(65) Prior Publication Data

US 2013/0246453 A1 Sep. 19, 2013

(51) Int. Cl.
*G06F 7/00* (2006.01)
*G06Q 50/00* (2012.01)
*G06F 17/30* (2006.01)
*G06F 9/44* (2006.01)

(52) U.S. Cl.
CPC .......... *G06Q 50/01* (2013.01); *G06F 17/30961* (2013.01); *G06F 8/36* (2013.01); *G06F 8/70* (2013.01)

(58) Field of Classification Search
CPC ................................................ G06F 17/30961
See application file for complete search history.

(56) References Cited

U.S. PATENT DOCUMENTS

| | | | |
|---|---|---|---|
| 5,493,678 A * | 2/1996 | Arcuri et al. .......................... 1/1 |
| 5,892,513 A | 4/1999 | Fay |
| 7,467,212 B2 | 12/2008 | Adams et al. |
| 7,853,661 B2 | 12/2010 | Bristol et al. |
| 8,024,317 B2 | 9/2011 | Nair |
| 8,136,145 B2 | 3/2012 | Fetterman et al. |
| 8,180,804 B1 * | 5/2012 | Narayanan et al. ........... 707/798 |
| 2002/0131431 A1 | 9/2002 | Wank |
| 2007/0005750 A1 | 1/2007 | Lunt |
| 2008/0172407 A1 | 7/2008 | Sacks |
| 2010/0198845 A1 | 8/2010 | Kutsch |
| 2012/0066118 A1 | 3/2012 | Dantas |

OTHER PUBLICATIONS

Friendship and Inheritance Friend Functions; www.cplusplus.com/doc/tutorial/inheritance Retrieved May 29, 2012.
International Search Report and Written Opinion correlating to PCT/US2013/032759 dated Sep. 26, 2013, 11 pages.
International Search Report and Written Opinion correlating to PCT/US2013/032751 dated Aug. 15, 2013, 7 pages.

* cited by examiner

*Primary Examiner* — Robert Beausoliel, Jr.
*Assistant Examiner* — Nirav K Khakhar
(74) *Attorney, Agent, or Firm* — Davidson + Sheehan LLP

(57) ABSTRACT

Embodiments of the claimed subject matter provide methods that support extension of web service application programming interfaces using query languages. In one embodiment, a method is provided that includes modifying an interface to a social graph. The social graph includes nodes connected by edges that represent relationships between the nodes, which form a plurality of trees associated with users to the social graph. Modifying the interface includes adding a node to at least one user's tree and attaching one or more queries to the node. The attached queries operate on a sub-tree of the added node. The interface is modified in response to the user(s) invoking a service configured to perform queries on the sub-tree.

31 Claims, 8 Drawing Sheets

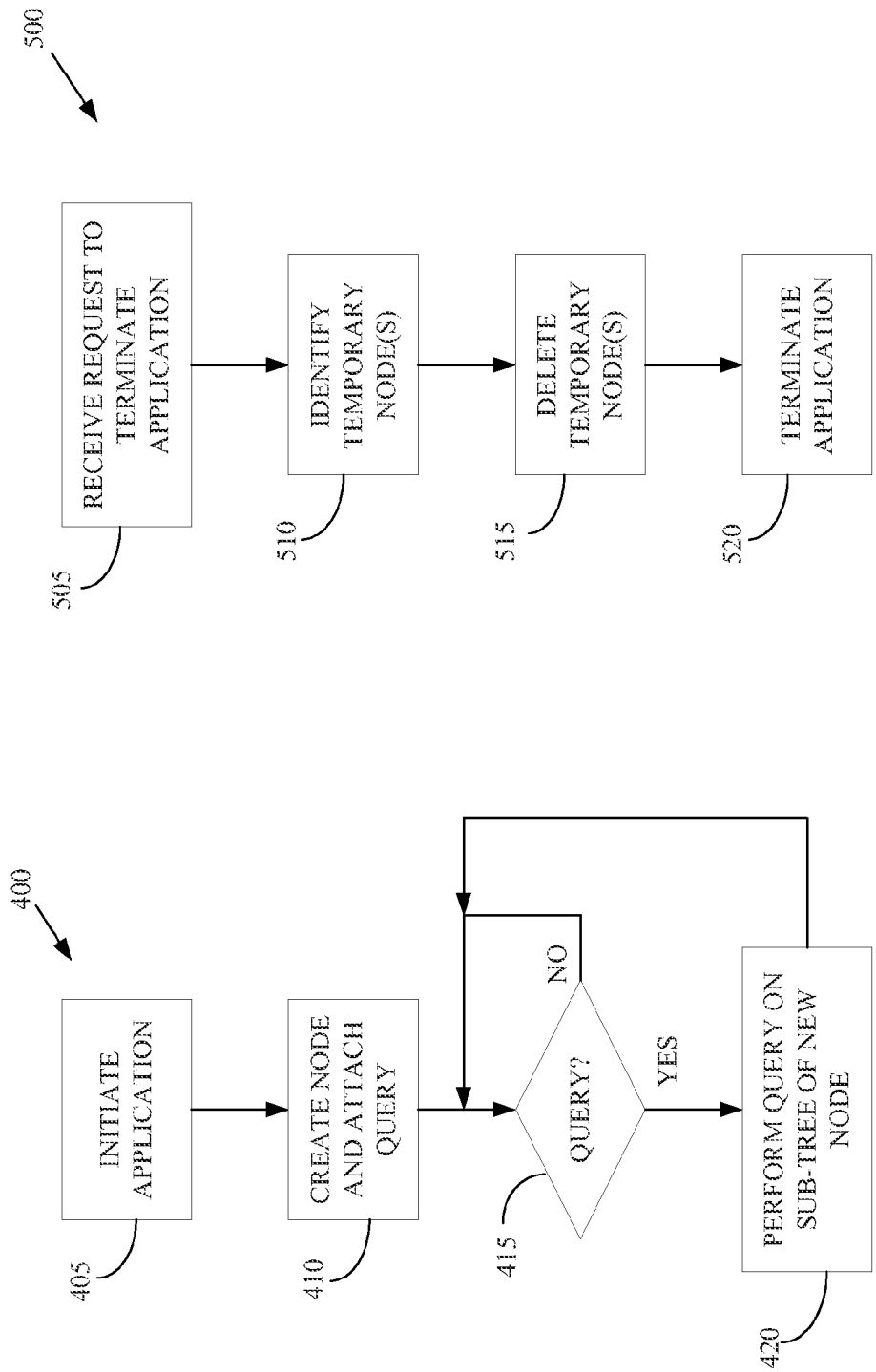

METHOD OF EXTENDING WEB SERVICE APPLICATION PROGRAMMING INTERFACES USING QUERY LANGUAGES

CROSS REFERENCE TO RELATED APPLICATIONS

This application is related to U.S. patent application Ser. No. 13/423,795, filed on Mar. 19, 2012, entitled "Method of Modifying Access Control for Web Services Using Query Languages" by Lawrence E. Menten".

TECHNICAL FIELD

This application relates generally to processor-based systems, and, more particularly, to application programming interfaces for processor-based systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known communication schemes, users communicate with each other using social networks. Social networking services can be defined as an online service, platform, or site that provides services to subscribers based upon a representation of social relations among people who may share a common background, interest, or activity. A social network typically consists of a representation of each user (often a profile), his/her social links, and a variety of additional elements such as photographs, status reports, web links, and the like. Most social network services are web-based and provide tools/services that allow users to interact over the Internet, such as e-mail and instant messaging. Social networking sites allow users to share ideas, activities, events, and interests within their individual networks. Exemplary social networks include Facebook, Google+, Twitter, LinkedIn, VKonkatke, Orkut, and RenRen.

Social networks represent individuals and their relations using a social graph. Generally; a social graph describes the relationships between a subscriber's online persona (which may also be referred to as the user's avatar) and other subscribers' online personas. The social graph therefore reflects the real-world relationships between the subscribers, which are generally referred to as the social network. For example, the social graph of a social network can be structured as a series of nodes (e.g., "Subscriber," "FriendsLists," "Close-Friends," etc.) that are associated with each other using edges (which may also be referred to as links or connections) defined by the relationships between the nodes. Leaf nodes are associated with a parent node but they have no child nodes. For example, leaf nodes associated with the "Close-Friends" node may each include a data structure including information for one of the subscriber's friends. The social graph may also include nodes for different types of relationships such as groups associated with a particular interest, as well as nodes for different types of information such as photographs, music, and web links.

Providers of social networks use the information in their social graph to implement services or applications (apps). Developers can create services or apps using an application programming interface (API) developed and supported by the social network provider. For example, an API for a social network such as Facebook includes a defined set of Hypertext Transfer Protocol (HTTP) request messages along with a definition of the structure of response messages, e.g., in an Extensible Markup Language (XML) or JavaScript Object Notation (JSON) format. The API for a social network usually implements a Representational State Transfer (REST) architecture that consists of clients and servers. Clients initiate requests to servers, which process requests and return appropriate responses to the clients. Requests and responses are built around the transfer of representations of resources. A resource can be virtually any coherent and meaningful concept that may be addressed. A representation of a resource is typically a document that captures the current or intended state of a resource. Generally, a REST-ful architecture must be client-server based, stateless, cacheable, layered, use a uniform interface, and may provide code on demand.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for extension of web service application programming interfaces using query languages. The method includes modifying an interface to a social graph. The social graph includes nodes connected by edges that represent relationships between the nodes, which form a plurality of trees associated with users to the social graph. Modifying the interface includes adding a node to at least one user's tree and attaching one or more queries to the node. The attached queries operate on a sub-tree of the added node. The interface is modified in response to the user(s) invoking a service configured to perform queries on the sub-tree. An apparatus for performing embodiments of the method may also be provided.

In another embodiment, a method is provided for extension of web service application programming interfaces using query languages. The method includes invoking a service configured to perform queries on a portion of a social graph that includes nodes connected by edges that represent relationships between the nodes. The nodes form a plurality of trees associated with users to the social graph. The method also includes receiving a request to authorize modification of an interface to the social graph by adding a node to a tree associated with a user that invoked the service. The interface is to be modified by attaching one or more queries to the node and the queries operate on a sub-tree of the added node. An apparatus for performing embodiments of the method may also be provided.

In yet another embodiment, a method is provided for extension of web service application programming interfaces using query languages. The method includes modifying an interface to a portion of a social graph associated with a user by providing support for one or more queries associated with the portion of the social graph. The interface is modified in response to the user invoking a service that implements the queries. The method also includes performing one or more of the queries on the portion of the social graph associated with the user. An apparatus for performing embodiments of the method may also be provided.

BRIEF DESCRIPTION OF THE DRAWINGS

The disclosed subject matter may be understood by reference to the following description taken in conjunction with the accompanying drawings, in which like reference numerals identify like elements, and in which:

FIG. 4 conceptually illustrates a first exemplary embodiment of a method of querying a modified application programming interface to a social graph;

FIG. 5 conceptually illustrates one exemplary embodiment of a method of removing a modification to an application programming interface to a social graph;

DETAILED DESCRIPTION OF SPECIFIC EMBODIMENTS

Figure 1:
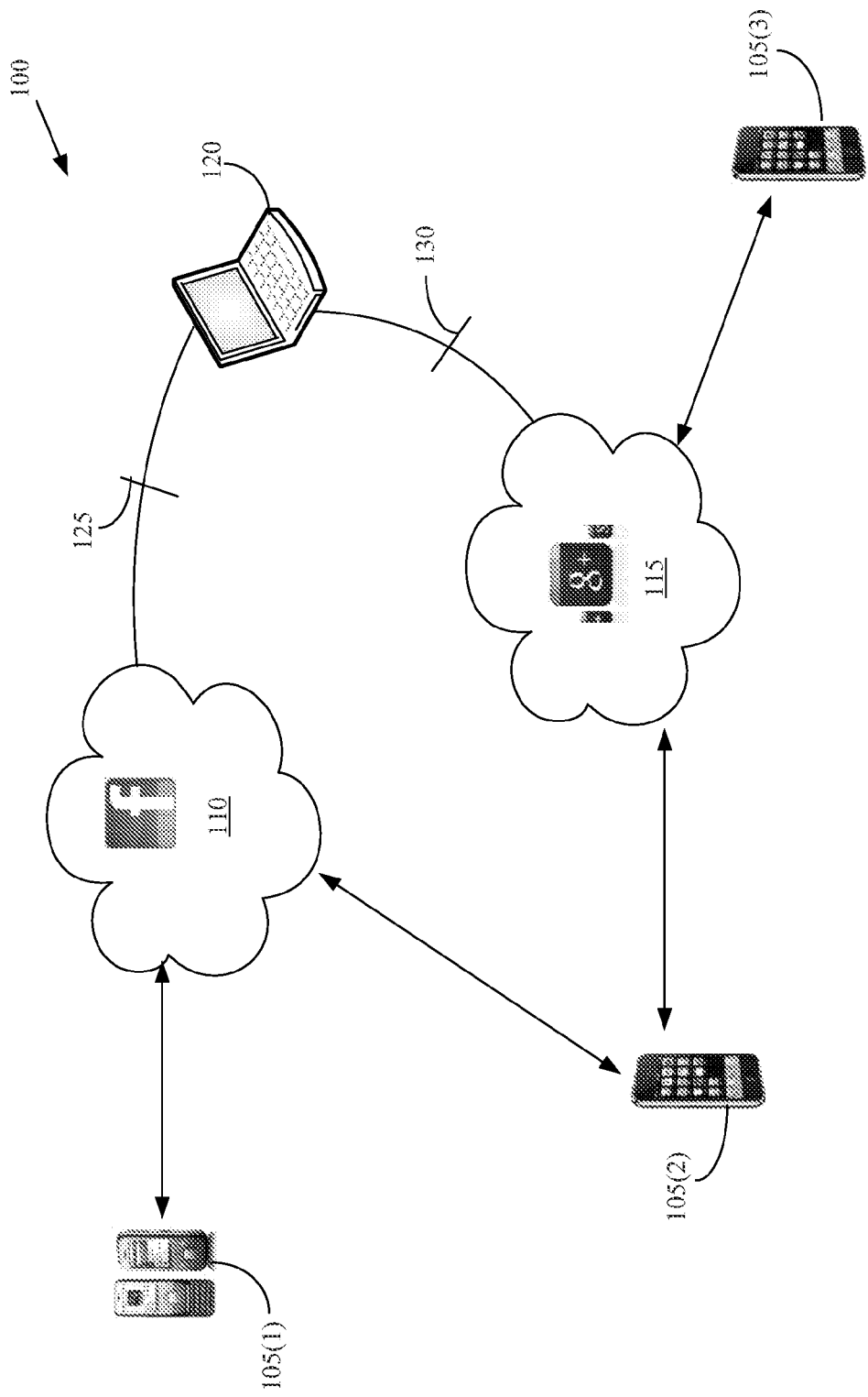
FIG. 1 conceptually illustrates one exemplary embodiment of a communication system.

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It will thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

The social graph of a social network can be structured as a series of nodes (e.g., "Subscriber," "FriendsLists," "CloseFriends," etc.) that may be associated with each other using edges defined by the relationships between the nodes. Many social graphs include a large number of nodes and relationships. For example, Facebook is fast approaching one billion subscribers. A provider of a social network service may invest significant time and resources into gathering information and constructing the social graph that specifies the relations between different subscribers to (or users of) the social network service. The value of the social network service may reside almost entirely in the social graph and the applications that provide useful services to users/subscribers based on the information included in the social graph. As such, providers may create social graph interfaces that control the visibility and accessibility of the data in the social graph to balance the competing desires for: (1) preventing third parties from appropriating the data in the social graph and (2) allowing developers sufficient visibility and access to the data in the social graph to create applications that provide useful services.

The present application describes embodiments of interfaces that allow developers to extend the provider-defined interface by defining a node for a user/subscriber (e.g., a node that is a child node of the root node for the user/subscriber) and then associating or attaching one or more queries to the new node. Embodiments of the queries may then operate on nodes in sub-trees attached to the new node. The queries may also use parameters defined by the context of the new node or parameters included in the query by the developer. Extension of the interface using the new node and queries may be subject to authorization by the user, subscriber, or the provider of the social graph. Leaf nodes of the new node may be populated using information in the social graph. The modified interface may then be used to create new services for the subscriber using the new queries.

FIG. 1 conceptually illustrates one exemplary embodiment of a communication system 100. In the illustrated embodiment, the communication system 100 includes a plurality of users or subscribers 105. As used herein, the term "subscriber" will be understood to refer to users that have subscribed to a social network service that supports a social graph. The term "user" will refer to people or entities that may be referenced in the social graph or associated with the social graph but which are not necessarily subscribers to the social network service. Subscribers may therefore be a subset of the users associated with a social network service. For example, a subscriber may be referred to as a registered user of a social network service. The users 105 are depicted as mobile communication devices such as smart phones. However, persons of ordinary skill in the art having benefit of the present disclosure should appreciate that the term "user" may refer to either the electronic device used to access the communication system 100 or to the person that owns or operates the device. Furthermore, persons of ordinary skill in the art should appreciate that the electronic devices are not limited to mobile communication devices and in some embodiments devices such as tablet computers, laptop computers, desktop computers, and the like may also be used to access the communication system 100. In various embodiments, the users 105 may access the communication system 100 using wired connections, wireless connections, or any combination thereof.

The users 105 may subscribe to one or more social network services 110, 115. Exemplary social network services include the social network service 110 provided by Facebook and the social network service 115 provided by Google+. However, persons of ordinary skill in the art having benefit of the present disclosure should appreciate that alternative embodiments of the communication system 100 may include other social network services such as Twitter, LinkedIn, VKonkatke, Orkut, RenRen, and the like. In the illustrated embodiment, the users 105(1-2) have subscribed to the social network service 110 and the users 105(2-3) have subscribed to the social network service 115. The users 105 may therefore have created profiles and established relationships to other subscribers in the social graphs of the social network services 110, 115. The users 105, information related to the users 105, or the relationships between the users 105 may be represented by the structure of the social graph. For example, the social graph of the social network 110 may include nodes (e.g., "Subscriber," "FriendsLists," "CloseFriends," etc.) that are associated with each other using edges defined by the relationships between the nodes.

Application developers 120 can develop applications (apps) or services that use the information in the social graphs of the social networks 110, 115 to generate and provide useful information to the users 105 or other third parties such as advertisers attempting to provide targeted advertising to the users 105. The application developers 120 create or define the applications or services using application programming interfaces (APIs) 125, 130 to the social network services 110, 115, respectively. The APIs 125, 130 are initially defined by the providers or owners of the social network services 110, 115 and the same APIs 125, 130 are supported for all of the users 105. As discussed herein, conventional interfaces cannot be changed or modified by the developers 120, which limits the range of possible applications or services that can be created by the developers 120 as well as the "user data" that can be accessed or disseminated. The present application therefore describes techniques for modifying the provider-defined APIs 125, 130, e.g. on a per-user or per-service basis. Rather than attempt to anticipate the granularity of access to service resources that may be required by new applications, the application developers 120 may extend the web service APIs 125, 130 using named query statements representing new views of data from the social graphs of the social networks 110, 115 that can be dynamically inserted into the resource hierarchy (e.g., the social graph) to extend the web service APIs 125, 130.

In one embodiment, the APIs 125, 130 conform to the constraints imposed by representational state transfer (REST) architectures. A REST-ful web service API 125, 130 to the social networking sites 110, 115 may provide a resource hierarchy (defined by the service API) and support read or write access to various elements of the social network information associated with each user 105. For example, the resource hierarchy may define a tree that includes non-leaf nodes that define categories or subsets of information. The tree may also define the nodes or leaves that represent the instances of data that may be read or written through the web service APIs 125, 130. This arrangement is typical of many web services. In conventional web services, the resource naming scheme is defined by the service provider and is not extensible.

Embodiments of the communication system 100 may allow developers 120 with appropriate permissions to extend this resource tree by adding leaf nodes representing new "views" of the data represented by the node to which the new leaf node is attached. These nodes can be named by the developer 120 and associated with a query that operates on the data subset (or sub-tree) identified by the branch of the tree in which the new leaf node is inserted. In various embodiments, the developer 120 may or may not be able to "see" the data in the tree, e.g., the service may only be able to provide information derived from the raw data and not the raw data itself. These nodes may be added through an off-line web interface or inserted through a HTTP POST request. The queries/views may be named or defined by the developer 120 or the queries/views may be selected from a menu of predefined "queries/views" available from the provider of the social network services 110, 115. In various alternative embodiments, query parameters may be defined by the developer, determined by the context/node, or dynamically determined by the service or application.

Figure 2:
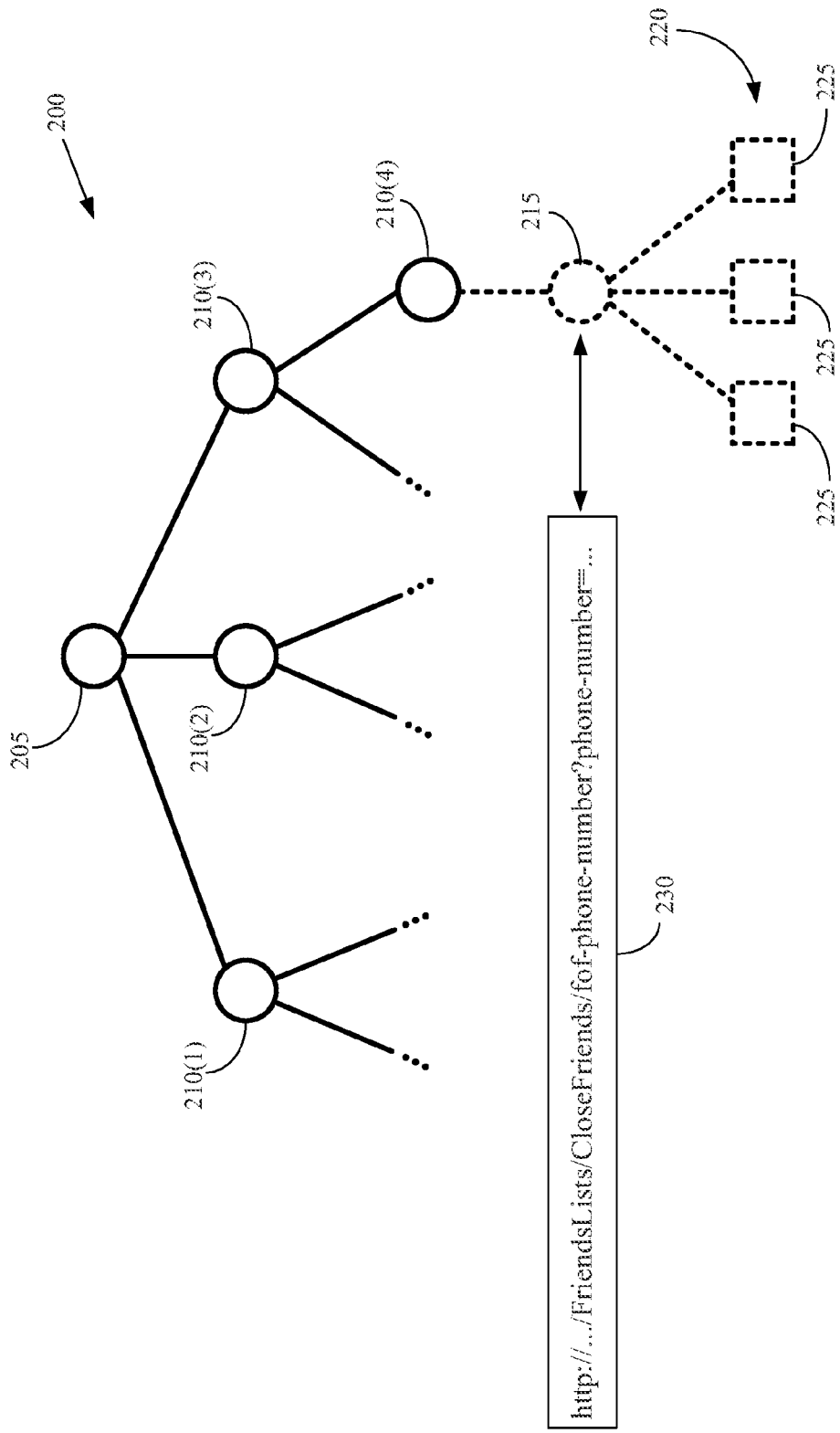
FIG. 2 conceptually illustrates a first exemplary embodiment of a portion of a social graph.

FIG. 2 conceptually illustrates one exemplary embodiment of a portion of a social graph 200. In the illustrated embodiment, the portion 200 is a sub-tree of the full social graph that includes nodes associated with a particular subscriber, "Joe Subscriber." The portion 200 can be accessed via an entry node or parent node 205. The portion 200 may be stored in one or more servers and clients can access the entry node 205 using the appropriate Uniform Resource Indicator (URI) or other address. For example, the entry node 205 may be accessed using the address http://www.fakesocialnetwork.com/Joe.Subscriber. The portion 200 also includes child nodes 210 that are connected to the entry node 205 or to other nodes within the portion 200. The child nodes 210 may be associated with information, categories, other subscribers, and the like. For example, the child nodes 210 may be associated with "Friends," "Photographs," "Profile," "Music," and the like. The nodes 200 may also be associated with groups of subscribers or users that share interests or groups that indicate the nature of the relationship between the users/subscribers such as family, close friends, acquaintances, professional contacts, etc. The nodes 210 may be accessed using corresponding addresses such as:

http://www.fakesocialnetwork.com/Joe.Subscriber/
FriendsLists/CloseFriends.

In the illustrated embodiment, developers or other third parties can add one or more nodes 215 to the portion 200 of the social graph corresponding to the subscriber. For example, a developer may use an HTTP POST command to insert a node 215 that is associated or attached to the node 210(4) of the sub-tree 200. The node 215 may then be accessed using the appropriate URI or other address. For example, the node 210(3) may be associated with "FriendsLists" of Joe Subscriber, the node 210(4) may be associated with "CloseFriends" of Joe Subscriber, and the node 215 may be associated with a category that includes the phone numbers for "CloseFriends" of Joe Subscriber. The node 215 may also be associated with or connected to a further sub-tree 220, which includes a plurality of leaf nodes 225 in the illustrated embodiment. However, persons of ordinary skill in the art having benefit of the present disclosure should appreciate that the sub-tree 220 may include different combinations of nodes or leaf nodes. The sub-tree 220 or the leaf nodes 225 may be populated by the developer, a third-party, the subscriber, or automatically by the service provider. The node 215 may be accessed using an address such as:

http://www.fakesocialnetwork.com/Joe.Subscriber/ FriendsLists/CloseFriends/CloseFriends_with_Numbers.

In some embodiments, the developer or third-party may need to obtain permission or authorization to add the nodes 215 to the social graph. For example, the developer or third-party may need to obtain permission or authorization from Joe Subscriber or the service provider or owner of the social graph. The authorization may only be valid for a limited amount of time, e.g., after a subscriber has invoked or initiated an application or service that utilizes the node 215 and until the subscriber terminates the application or service. The node 215 may therefore be a temporary or dynamic node stored by provider.

The interface to the social graph 200 may be modified to support queries that operate on nodes in the tree 200 such as the sub-tree 220 of the node 215 that was added by the developer. In one embodiment, the developer may use a message or command to define a query and attach the query to one or more nodes to modify an application programming interface (API) to the social graph 200. For example, the node 215 may be created and a query 230 may be attached to the node 215 (e.g., the CloseFriends_with_Numbers node) in response to Joe Subscriber invoking a service that utilizes the query 230. The query 230 may also be attached to other nodes in the portion 200 of the social graph. For example, the query 230 may be represented by a query node "fof-phone-number" that may be designed to be attached to the node FriendsLists or to a node such as CloseFriends that further qualifies the list of friends. The query 230 may operate on each of the lists of friends referenced by FriendsLists or upon each of the friends referenced in one of the lists (e.g., CloseFriends) to locate friends of the friends and compare the phone number with that of each friend of one's own friends. One example of an address that invokes the query is:

http://www.fakesocialnetwork.com/Joe.Subscriber/ FriendsLists/fof-phone-number, which invokes the query attached to the FriendsLists node. Another example is:

http://www.fakesocialnetwork.com/Joe.Subscriber/ FriendsLists/CloseFriends/fof-phone-number, which invokes the query attached to the FriendsLists/CloseFriends node. Embodiments of conventional query languages may typically be flexible enough to allow a single query to be designed that may be applied in different positions or nodes within the social graph 200. The nodes may be selected for each query 230 by the developer or the nodes may be selected using an automated procedure or algorithm. For example, the social networking site may examine the query 230, select the appropriate nodes to which to apply the query 230, apply the query 230 iteratively (or concurrently) to the selected nodes in the tree, and combine the results.

In one alternative embodiment, which may be practiced in addition to or instead of the other embodiments described herein, the modified Web service API may provide an API that defines Joe Subscriber's "friend's list" as a node in the resource hierarchy. To this node, the developer (with appropriate permissions) may add the leaf node "has-friend-with-caller-id" and associate this new node with a query (expressed in SQL, SPARQL, or similar) that provides a new resource that can be accessed to determine whether or not a caller id is associated with a friend of a friend of the subscriber. One example of the query 230 may be:

http://www.fakesocialnetwork.com/Joe.Subscriber/ FriendsLists/CloseFriends/CloseFriends_with_Number/fof-phone-number?phone-number=212-555-1212.

The query 230 returns a Boolean value that is TRUE when the phone number of a close friend of Joe Subscriber is the same as the phone number in the query 230. The query returns a Boolean value that is FALSE when none of the close friends of Joe Subscriber have indicated that they have the phone number in the query 230.

Figure 3:
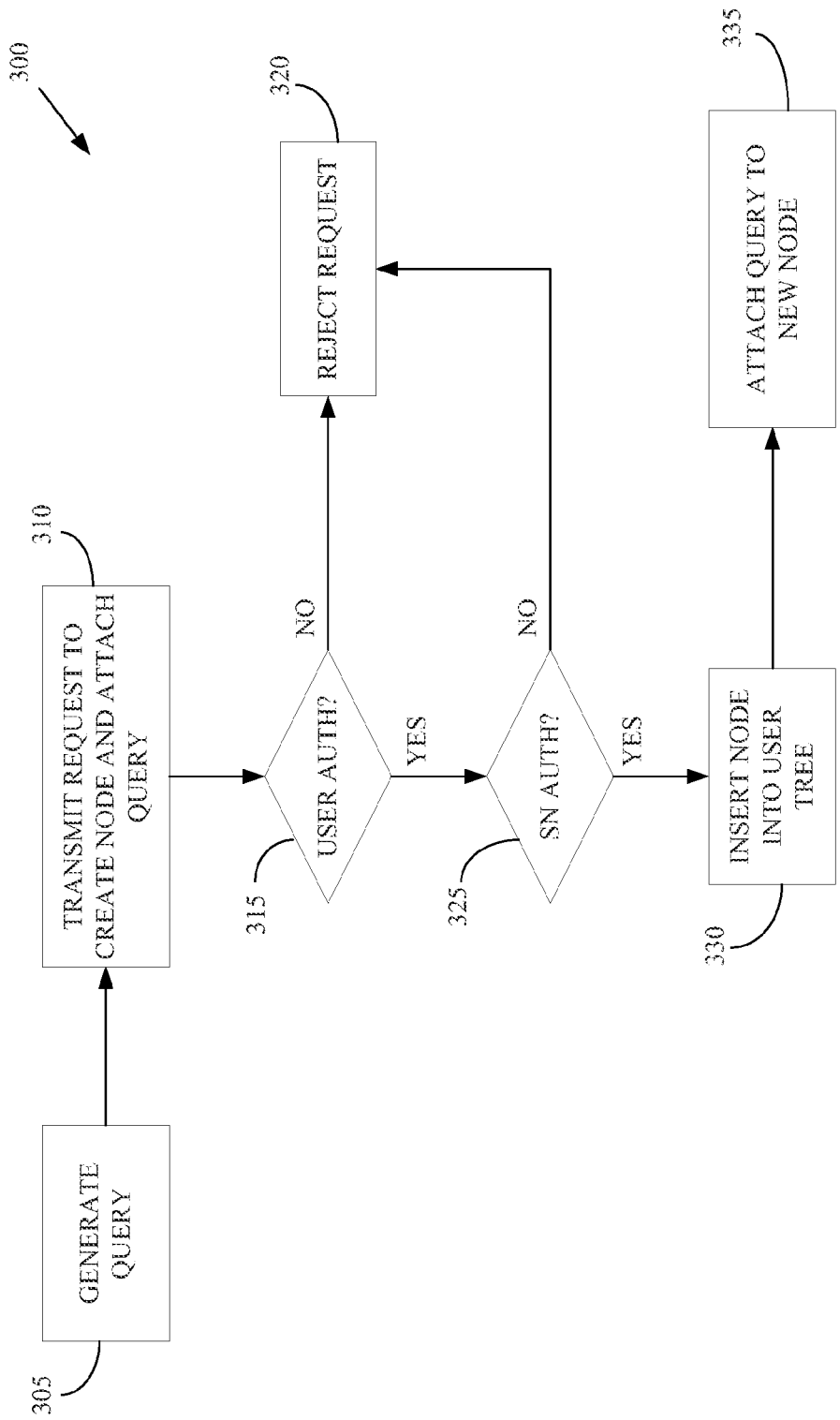
FIG. 3 conceptually illustrates a first exemplary embodiment of a method for modifying an interface to a social graph.

FIG. 3 conceptually illustrates a first exemplary embodiment of a method 300 for modifying an interface to a social graph. In the illustrated embodiment, a query is generated (at 305) by a developer or third-party. The query may be used as part of a service or application created by the developer or third-party. The query may operate on a sub-tree of a node that is defined by the developer or third-party and is intended to be inserted into a portion of a social graph associated with one or more users, e.g., subscribers that have invoked the service that utilizes the query. The developer or third-party may then transmit (at 310) a request to create the node and attach the query to the newly created node. For example, a query expression may be written as a REST-ful POST request that requests a modification of the programmer's view of the API to the social graph. With the appropriate authorization, a post request to the URI:

http://www.fakesocialnetwork.com/Joe.Subscriber/ FriendsLists/ to extend the API might be written as follows:

```
POST /Joe.Subscriber/FriendsLists/ HTTP/1.0
Content-Type: text/xml
<extend>
    <node>has-friend-with-phone-number</node>
    <query>SELECT ...</query>
</extend>
```

However, persons of ordinary skill in the art having benefit of the present disclosure should appreciate that other query expressions or formats may be used for the request.

In the illustrated embodiment, the request may require authorization from the user/subscriber. The user authorization process may be performed (at 315) to verify that the user has authorized inserting the new node into the user's social graph. User authorization can be performed using various techniques. For example, the request to create the node and attach the query may include a request to initiate authentication/authorization process that allows the user to indicate (at 315) whether they approve or allow creation of the new node and implementation of the new query. The request is rejected (at 320) if the user does not provide confirmation or authentication. The request may proceed if the subscriber confirms or authenticates the request.

In the illustrated embodiment, the request may also require authorization from the provider or owner of the social network (SN) service. The provider authorization process may be performed (at 325) to verify that the provider/owner has authorized inserting the new node into the user's social graph. Provider authorization can be performed using various techniques. For example, the request to create the node and attach the query may include a request to initiate an authentication/authorization process that allows the provider to indicate (at 315) whether they approve or allow creation of the new node or implementation of the new query. In one embodiment, the provider may perform the authentication/authorization process using an automated system that reviews the request and determines whether the request complies with security, privacy, or other policies established by the provider. Before installation into the web service, the query may be mechanically validated to assure that it complies with the security/usage policy of the web service. For example, the web service may only allow queries that return Boolean results or counter values and may restrict the node types with which such a query may be associated (e.g. only the "FriendsLists" node). The request is rejected (at 320) if the provider does not provide confirmation or authentication. The request may proceed if the provider confirms or authenticates the request. Persons of ordinary skill in the art having benefit of the present disclosure should appreciate that the particular authentication sequence depicted in FIG. 3 is intended to be illustrative. Alternative embodiments may perform the user and provider authentication processes concurrently or in a different order than the one depicted in FIG. 3. Moreover, other alternative embodiments may only perform user authentication or provider authentication, but not both, or may not perform any authentication at all.

Once the request has been authorized, the requested node can be inserted (at 330) at the selected position within the social graph. The interface to the social graph can then be modified by attaching (at 335) the query to the new node. The developer or third-party, or other entities, may then be able to use the modified interface to develop applications or services that utilize the new query. For example, the POST request described above may result in extending the API for the subscriber (Joe Subscriber) so that it is now possible to make a GET request for the URI:

http://www.fakesocialnetwork.com/Joe.Subscriber/
FriendsLists/has-friend-with-phone-
number?friend=Jane.Subscriber&phone-number=202-
555-1313

Embodiments of the method 300 may therefore support modified interfaces that provide a wider and more varied set of queries while reducing the risk of providing excessive or complete access to the underlying database that represents the social graph. The modification made by the POST request may only affect the user who authorized the request (Joe Subscriber) and can be reversed by a corresponding HTTP DELETE request or other operation. In one embodiment, the mechanism for inserting the query may be to create a record that is associated with the end user. The inserted record may contain the query and the associated path to be used in the GET request. In various embodiments, the Web service supports one or query languages and publishes a schema to accompany the query languages.

FIG. 4 conceptually illustrates one exemplary embodiment of a method 400 of querying a modified application programming interface to a social graph. In the illustrated embodiment, the method 400 modifies the application programming interface on a per-user and per-application basis so that the interface is not globally changed for all time, but is only changed when particular users invoke a service that uses the modified interface and, in some embodiments, only for those users that have invoked the related service and authorized modification of the interface to the relevant portion of the social graph. One or more users may initiate (at 405) a service or application. The initiated application may utilize a query that is not supported by the provider-defined API. One or more new nodes may then be created and the query may be attached to the new node (at 410). Embodiments of techniques for creating notes and attaching queries are depicted in FIG. 3.

The service provider (e.g., using software implemented on one or more servers owned or operated by the service provider) may then monitor (at 410) queries associated with the service. Monitoring may continue as long as the service provider does not detect (at 410) any queries. When the service provider detects (at 415) a query, e.g., a query performed as part of the service requested or invoked by the subscriber, the query can be performed (at 420) on information included in a sub-tree of the node associated with the query. For example, the query may return (at 420) a Boolean value, a count value, or other value determined based on the information included in the sub-tree of the node.

FIG. 5 conceptually illustrates one exemplary embodiment of a method 500 of removing or reversing a modification to an application programming interface to a social graph. In the illustrated embodiment, the application programming interface has been previously modified (e.g., as described herein with regard to FIGS. 3-4) on a per-user and per-application basis in response to one or more users invoking a service that uses the modified interface and, in some embodiments, only for those users that have invoked the related service and authorized modification of the interface to the relevant portion of the social graph. One or more of the users that previously initiated the service, which resulted in modification of the interface to their social graph, may decide to terminate the application. The service provider may therefore receive (at 505) a request to terminate the application. The service provider may then identify (at 510) the temporary nodes that were created in the social graph to support the modified interface. Identification (at 510) of the temporary nodes may be performed using information stored by the service provider or information provided by the user. The temporary nodes may then be deleted (at 515) and the application may be terminated (at 520). In one embodiment, deletion (at 515) of the temporary nodes may include removal of nodes, leaf nodes, sub-trees, or other information associated with the temporary node.

Figure 6:
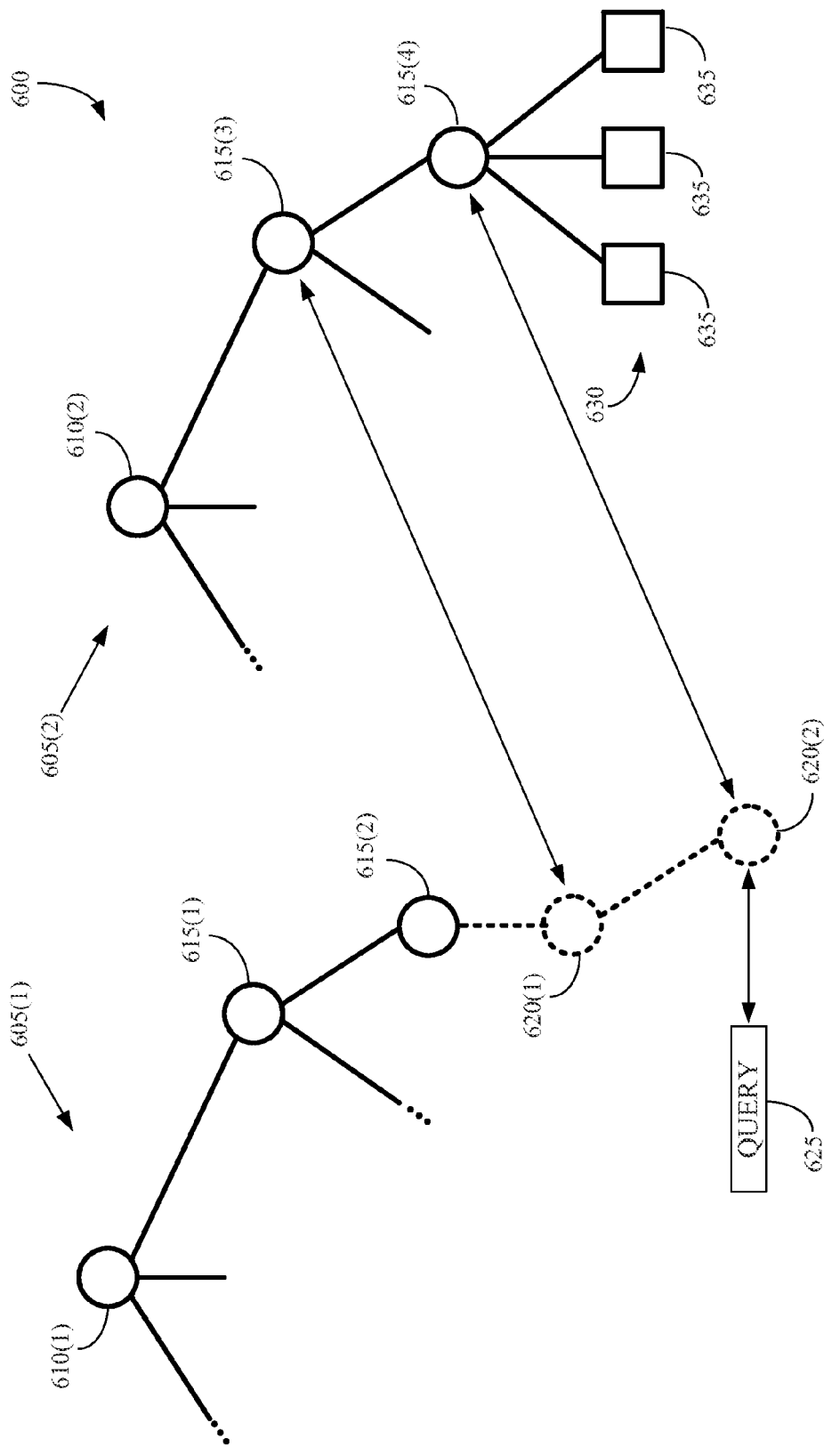
FIG. 6 conceptually illustrates a second exemplary embodiment of portions of a social graph.

FIG. 6 conceptually illustrates a second exemplary embodiment of portions 605 of a social graph 600. The illustrated embodiment, the portions 605 are sub-trees of the full social graph that include nodes associated with two subscribers, "Joe Subscriber" and "Frank Friendly." Each portion 605 can be accessed via an entry node or parent node 610. As discussed herein, the portions 605 may be stored in one or more servers and clients can access the entry nodes 610 using the appropriate Uniform Resource Indicator (URI) or other address. For example, the entry node 610(1) may be accessed using the address:

http://www.fakesocialnetwork.com/Joe.Subscriber.

The portions 605 also include child nodes 615 that are connected to the entry nodes 610 or to other nodes within the portions 605. The child nodes 615 may be associated with information, categories, other subscribers, and the like. For example, the child nodes 615 may be associated with "Friends," "Photographs," "Profile," "Music," and the like. The nodes 615 may also be associated with groups of users that share interests. The nodes 615 may be accessed using corresponding addresses such as:

http://www.fakesocialnetwork.com/Joe.Subscriber/
FriendsLists.

In the illustrated embodiment, the subscribers "Joe Subscriber" and "Frank Friendly" are friends that are connected by the "Friend" relationship in the social graph 600. For example, the node 615(2) in the portion 605(1) may represent a person in the "CloseFriends" group for Joe Subscriber and may be associated with or include information related to the portion 605(2) of the social graph 600. However, Joe Subscriber only "owns" the relationship with Frank Friendly but may not have privileges or authority to perform any modifications of the portion 605(2) of the social graph 600 that is owned by Frank Friendly. Joe Subscriber may therefore not be able to insert new nodes into the sub-tree 605(2) or attach queries to existing or new nodes in the sub-tree 605(2), e.g., in the manner discussed herein with regard to FIGS. 2-5.

The interface to the social graph 600 may alternatively be modified by adding one or more shadow nodes 620 to the portion 605(1) and then attaching one or more queries 625 to the shadow nodes 620. In one embodiment, the shadow nodes 620(1-2) that are inserted into the portion 605(1) correspond to nodes 615(3-4) in the portion 610(2), as indicated by the double headed arrows. The shadow nodes 620(1-2) are interrelated or connected in the same way as the nodes 615(3-4) and so the path from the node 615(2) through the shadow node 620(1) and to the shadow node 620(2) is the same as the path from the entry node 610(2) to the node 615(3) and the node 615(4). For example, the shadow nodes 620 may be part of a sparse tree that represents or shadows the nodes 615(3-4). Adding the shadow nodes 620 and attaching the query 625 may be performed following authentication or authorization of the request by the user or the provider/owner of the social network, as discussed herein.

The query 625 can be defined to operate on a sub-tree 630 of the node 615(4), which may include leaf nodes 635 as well as other nodes that are not shown in FIG. 6. The interface to the social graph can then be modified by attaching the query to the new node 620(2). A developer or third-party, or other entities, may use the modified interface to develop applications or services that utilize the new query. For example, the API for the subscriber (Joe Subscriber) may be extended so that it is now possible to make a GET request for the URI associated with Frank Friendly:

http://www.fakesocialnetwork.com/Joe.Subscriber/
FriendsLists/CloseFriends/Frank.Friendly/Friend-
sLists/CloseFriends/
number!friend=Nancy.Friendly&phone-number=202-
555-1414

Path matching techniques, or other techniques, may be used to "follow" the path indicated in the address/request for the query 625 and to match the path indicated by the shadow nodes 620(1-2) with the path indicated by the nodes 615(3-4). The query 625 may then be performed on the sub-tree 630. Thus, using shadow nodes 620 may allow the interface to the social graph 600 to be extended to allow developers or third parties to define queries for one subscriber that operate on portions of the social graph that are owned or associated with other subscribers.

Figure 7:
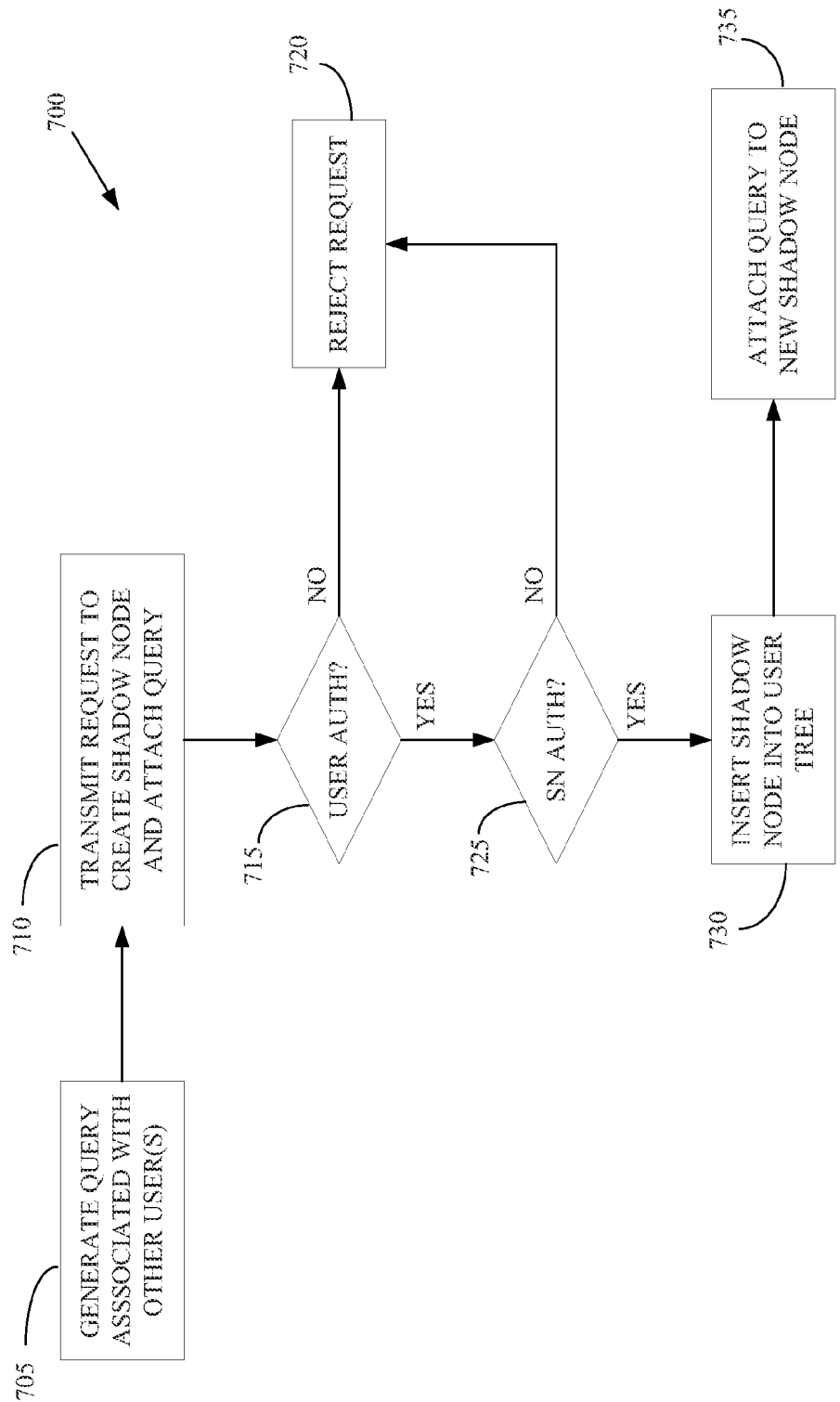
FIG. 7 conceptually illustrates a second exemplary embodiment of a method for modifying an interface to a social graph.

FIG. 7 conceptually illustrates a second exemplary embodiment of a method 700 for modifying an interface to a social graph. The second exemplary embodiment of the method 700 differs from the first exemplary embodiment of the method 300 depicted in FIG. 3 because the inserted nodes are shadow nodes and the attached queries may operate on nodes associated with other users. In the illustrated embodiment, a query is generated (at 705) by a developer or third-party, e.g., in response to a subscriber invoking the service that utilizes the query. The developer or third-party may then transmit (at 710) a request to create the shadow node in the user's portion of the social graph and attach the query to the newly created shadow node. For example, a query expression may be written as a REST-ful POST request that requests a modification of the programmer's view of the API to the social graph, as discussed herein.

In the illustrated embodiment, the request may require authorization from the user. The user authorization process may be performed (at 715) to verify that the user has authorized inserting the new node into the social graph. User authorization can be performed using various techniques, as discussed herein. The request is rejected (at 720) if the user does not provide confirmation or authentication. The request may proceed if the user confirms or authenticates the request. In the illustrated embodiment, the request may also require authorization from the provider or owner of the social network (SN) service. The provider authorization process may be performed (at 725) to verify that the provider/owner has authorized inserting the new node into the social graph, as discussed herein. The request is rejected (at 720) if the provider does not provide confirmation or authentication. The request may proceed if the provider confirms or authenticates the request. Persons of ordinary skill in the art having benefit of the present disclosure should appreciate that the particular authentication sequence depicted in FIG. 7 is intended to be illustrative. Alternative embodiments may perform the subscriber and provider authentication processes concurrently or a different order than the one depicted in FIG. 7. Moreover, other alternative embodiments may only perform subscriber authentication or provider authentication, but not both, or may not perform any authentication at all.

Once the request has been authorized, the requested shadow node can be inserted (at 730) at the selected position within the social graph. The interface to the social graph can then be modified by attaching (at 735) the query to the new shadow node. The developer or third-party, or other entities, may then be able to use the modified interface to develop applications or services that utilize the new query, which operates on nodes in the portions of the social graph node are associated with other users, as discussed herein. The modification can be reversed, e.g. by a corresponding HTTP DELETE request. In one embodiment, the mechanism for inserting the query may be to create a record that is associated with the end user. The inserted record may contain the query and the associated path to be used in the GET request. In various embodiments, the Web service supports one or query languages and publishes a schema to accompany the query languages.

Figure 8:
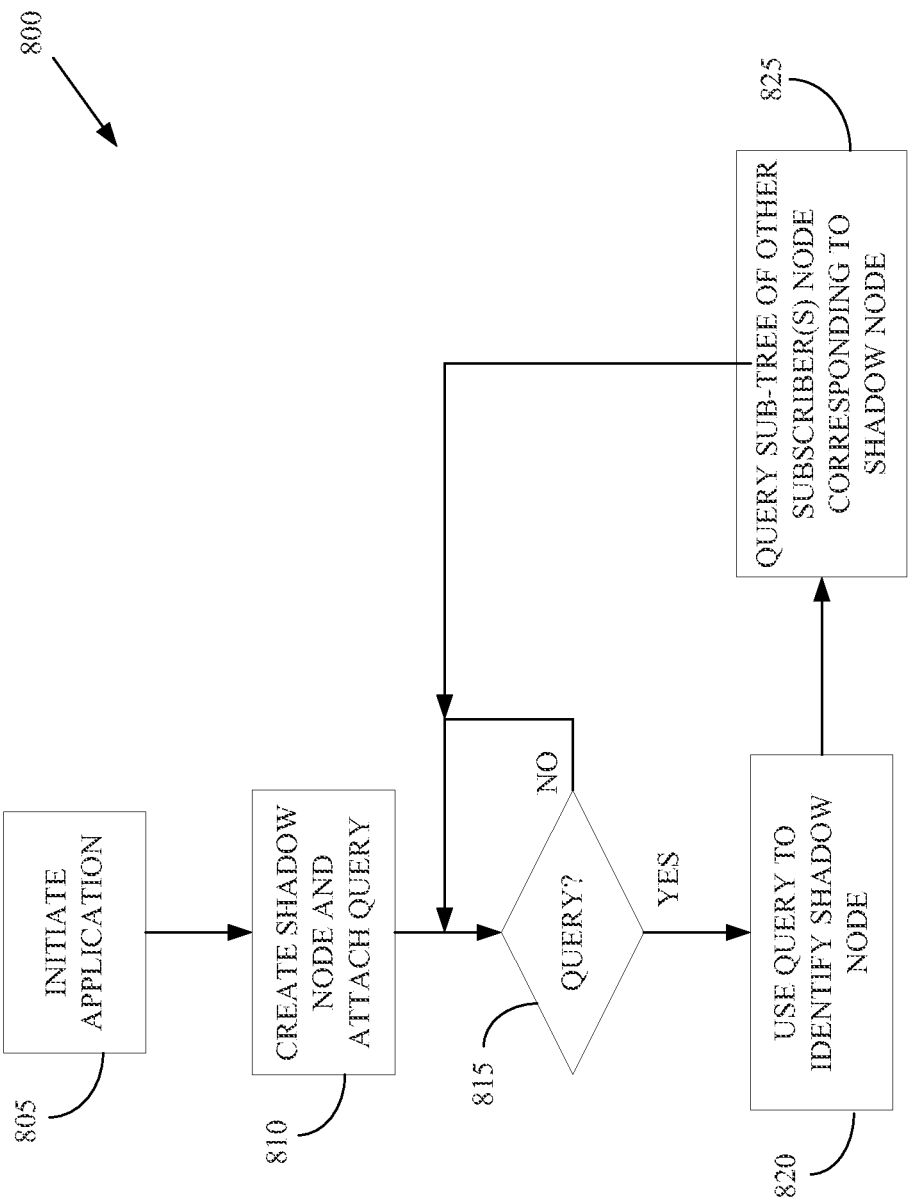
FIG. 8 conceptually illustrates a second exemplary embodiment of a method of querying a modified application programming interface to a social graph.

FIG. 8 conceptually illustrates a second exemplary embodiment of a method 800 of querying a modified application programming interface to a social graph. In the illustrated embodiment, the method 800 modifies the application programming interface on a per-user and per-application basis so that the interface is not globally changed for all time, but is only changed when particular users invoke a service that uses the modified interface and, in some embodiments, only for those users that have invoked the related service and authorized modification of the interface to the relevant portion of the social graph. The second exemplary embodiment of the method 800 differs from the first exemplary embodiment of the method 400 depicted in FIG. 4 because the inserted nodes are shadow nodes in the social graph and the attached queries may operate on nodes associated with other subscribers.

In the illustrated embodiment, one or more users may initiate (at 805) a service or application. The initiated application may utilize a query that is not supported by the provider-defined API. Furthermore, the query may operate on nodes in the sub-trees of other users in the social network. One or more new shadow nodes may then be created in the sub-tree of the requesting user and the query may be attached to the new shadow node (at 810). As discussed herein, the shadow node may be created (at 810) and inserted into the social graph at a location that matches or corresponds to a path through the sub-trees of the other subscribers to the social network. Embodiments of techniques for creating the shadow node and attaching the query are depicted in FIG. 7.

The service provider (e.g., using software implemented on one or more servers owned or operated by the service provider) may then monitor (at 810) queries associated with the service. Monitoring may continue as long as the service provider does not detect (at 815) any queries. When the service provider detects (at 815) a query, e.g., a query performed as part of the service requested or invoked by the user, the query can be used to identify (at 820) the shadow node and the corresponding node in one or more other sub-trees, e.g., using pattern matching techniques. The query can be performed (at 825) on information included in a sub-tree of the node in the other user's social graph. For example, the query may return (at 825) a Boolean value, a count value, or other value determined based on the information included in the sub-tree of the node indicated by the shadow node that is attached to the query. As discussed herein, the shadow nodes can be deleted or removed in response to termination of the service or application that utilizes the shadow nodes.

Figure 9:
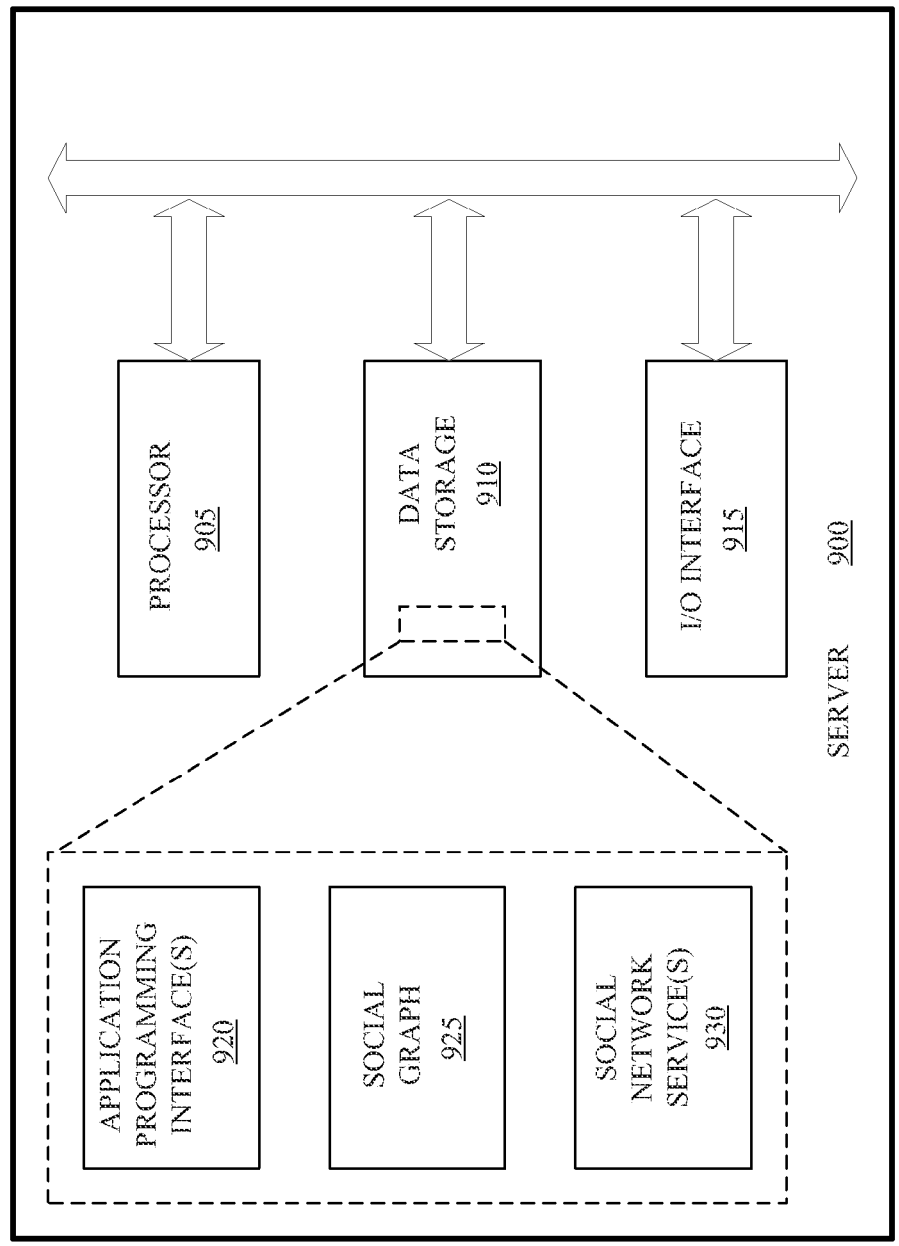
FIG. 9 conceptually illustrates one exemplary embodiment of a server that may be used to store portions of a social graph, implement application programming interfaces to a social graph, provide access control to resources of the social graph, or implement social network services.

FIG. 9 conceptually illustrates one exemplary embodiment of a server 900 that may be used to store portions of a social graph, implement application programming interfaces to a social graph, provide access control to resources of the social graph, or implement social network services. In the illustrated embodiment, the server 900 includes a processor 905, data storage 910, and an input/output (I/O) interface 915. The processor 905 is configured to control operation of the server 900, e.g., using data or instructions stored in the data storage 910 or at other locations. Embodiments of the operations that may be performed by the server 900 are described herein in conjunction with FIGS. 1-8. In one embodiment, the data storage 910 stores information 920 that represents one or more application programming interfaces to the social graph including information that provides access control to resources of the social graph, information 925 that represents portions of the social graph, or information 930 that represents social network services that may use information stored in social graph.

Although FIG. 9 depicts a single server 900, persons of ordinary skill in the art having benefit of the present disclosure should appreciate that alternative embodiments may use multiple servers and may distribute portions of the functionality depicted FIG. 9 throughout the multiple servers. In some embodiments, the server 900 may be a virtual machine. In some of these embodiments, the virtual machine may include components from different machines or be geographically dispersed. For example, the data storage 910 and the processor 905 may be in two different physical machines. When processor-executable programs such as the social network services 930 are implemented on the processor 905, the program code segments combine with the processor 905 to provide a unique device that operates analogously to specific logic circuits.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
modifying an interface to a social graph comprising nodes connected by edges that represent relationships between the nodes, wherein the nodes form a plurality of trees associated with users of the social graph, and wherein modifying the interface comprises:
adding a first node to at least one user's tree; and
attaching at least one query to the first node, wherein the at least one query operates on a sub-tree of the first node, and further wherein the interface is modified in response to the at least one user invoking a service configured to perform the at least one query on the sub-tree.

2. The method of claim 1, wherein adding the first node to the at least one user's tree comprises adding the first node in response to determining that the at least one user authorized adding the first node.

3. The method of claim 1, wherein adding the first node to the at least one user's tree comprises adding the first node in response to determining that a service provider that owns the social graph authorized adding the first node and attaching the at least one query to the first node.

4. The method of claim 1, wherein attaching the at least one query to the first node comprises attaching at least one of a query defined by a third-party developer or a query selected from a set of queries defined by a service provider that owns the social graph.

5. The method of claim 1, wherein adding the first node comprises adding a shadow node associated with a second node in at least one other user's tree, and wherein attaching the at least one query to the first node comprises attaching at least one query to the shadow node, wherein the at least one query attached to the shadow node operates on a sub-tree of the second node in the at least one other user's tree.

6. The method of claim 1, comprising receiving a request to modify the interface, wherein the request comprises information indicating the first node and the at least one query.

7. The method of claim 1, comprising receiving a request to delete the first node and deleting the first node and the at least one query in response to receiving the request to delete the first node.

8. The method of claim 7, comprising receiving the request to delete the first node in response to the at least one user terminating the service.

9. A method, comprising:
invoking a service configured to perform queries on a portion of a social graph comprising nodes connected by edges that represent relationships between the nodes, wherein the nodes form a plurality of trees associated with users to the social graph; and
receiving a request to authorize modification of an interface to the social graph by adding a node to a tree associated with a user that invoked the service, wherein the interface is to be modified by attaching at least one query to the node, wherein the at least one query operates on a sub-tree of the added node.

10. The method of claim 9, comprising authorizing the request to modify the interface, and wherein the interface to the social graph is modified in response to authorization of the request.

11. The method of claim 10, wherein operation of the service is initiated in response to modification of the interface to the social graph.

12. The method of claim 11, comprising requesting termination of the service, and wherein a request to delete the node is provided in response to the request for termination of the service.

13. The method of claim 12, comprising terminating the service after deleting the node.

14. A method, comprising:
modifying an interface to a portion of a social graph associated with a user by providing support for at least one query associated with the portion of the social graph, wherein the interface is modified in response to the user invoking a service that implements the at least one query; and
performing the at least one query on the portion of the social graph associated with the user.

15. The method of claim 14, wherein modifying the interface comprises adding the node to the user's tree and attaching the at least one query to the node, wherein the at least one query operates on a sub-tree of the node.

16. The method of claim 15, wherein modifying the interface comprises adding a shadow node to the user's tree and attaching the at least one query to the shadow node, wherein the at least one query operates on a sub-tree of a node in another user's tree, and wherein the shadow node is associated with the node in the other user's tree.

17. The method of claim 16, wherein performing the at least one query comprises performing the at least one query on the sub-tree of the node in the other user's tree.

18. The method of claim 14, comprising requesting, in response to the user invoking the service, authorization to modify the interface from at least one of the user or a service provider that owns the social graph.

19. The method of claim 18, wherein modifying the interface comprises modifying the interface in response to receiving authorization for the modification from the at least one of the user or the service provider.

20. The method of claim 14, comprising removing the modification to the interface in response to termination of the service.

21. An apparatus for providing access control to portions of a social graph, the apparatus comprising:
a data storage; and
a processor communicatively coupled to the data storage, the processor being configured to:
modify an interface to a social graph comprising nodes connected by edges that represent relationships between the nodes, wherein the nodes form a plurality of trees associated with users of the social graph, and wherein modifying the interface comprises:
adding a node to at least one user's tree; and
attaching at least one query to the node, wherein the at least one query operates on a sub-tree of the added node,
and further wherein the interface is modified in response to the at least one user invoking a service configured to perform the at least one query on the sub-tree.

22. The apparatus of claim 21, wherein the processor is configured to add the node in response to determining that the at least one user authorized adding the node.

23. The apparatus of claim 21, wherein the processor is configured to add the node in response to determining that a service provider that owns the social graph authorized adding the node and attaching the at least one query to the node.

24. The apparatus of claim 21, wherein the processor is configured to add a shadow node associated with a second node in at least one other user's tree, and wherein the processor is configured to attach the at least one query to the shadow node, wherein the at least one query attached to the shadow node operates on a sub-tree of the second node in the at least one other user's tree.

25. An apparatus for providing access control to portions of a social graph, the apparatus comprising:
a data storage; and
a processor communicatively coupled to the data storage, the processor being configured to:
invoke a service configured to perform queries on a portion of a social graph comprising nodes connected by edges that represent relationships between the nodes, wherein the nodes form a plurality of trees associated with users to the social graph; and
receive a request to authorize modification of an interface to the social graph by adding a node to a tree associated with a user that invoked the service, wherein the interface is to be modified by attaching at least one query to the node, wherein the at least one query operates on a sub-tree of the added node.

26. The apparatus of claim 25, wherein the processor is configured to authorize the request to modify the interface, and wherein and wherein the processor is configured to modify the interface to the social graph in response to authorization of the request.

27. An apparatus for providing access control to portions of a social graph, the apparatus comprising:
a data storage; and
a processor communicatively coupled to the data storage, the processor being configured to:
modify an interface to a portion of a social graph associated with a user by providing support for at least one query associated with the portion of the social graph, wherein the interface is modified in response to the user invoking a service that implements the at least one query; and perform the at least one query on the portion of the social graph associated with the user.

28. The apparatus of claim 27, wherein the processor is configured to add the node to the user's tree and attach the at least one query to the node, wherein the at least one query operates on a sub-tree of the node.

29. The apparatus of claim 27, wherein the processor is configured to add a shadow node to the user's tree and attach the at least one query to the shadow node, wherein the at least one query operates on a sub-tree of a node in another user's tree, and wherein the shadow node is associated with the node in the other user's tree.

30. The apparatus of claim 29, wherein the processor is configured to request, in response to the user invoking the service, authorization to modify the interface from at least one of the user or a service provider that owns the social graph, and wherein the processor is configured to modify the interface in response to receiving authorization for the modification from the at least one of the user or the service provider.

31. The apparatus of claim 27, wherein the processor is configured to remove the modification to the interface in response to termination of the service.

* * * * *